INVENTORS
CHARLES H. YOUNG
PAUL A. MUNDAY

ATTORNEY

INVENTORS
CHARLES H. YOUNG
PAUL A. MUNDAY
BY J. Hart Evans
ATTORNEY

Fig. 7.

HYDROXYL ABSORPTION OF THE HEXANE-EXTRACTED PORTION OF THE BUTYLATED PHENOLS DESCRIBED IN EXAMPLE 3. CONCENTRATION = 0.3 MOLAR IN CARBON TETRACHLORIDE.

Fig. 8.

HYDROXYL ABSORPTION OF THE DIETHLENE GLYCOL-EXTRACTED PORTION OF THE BUTYLATED PHENOLS DESCRIBED IN EXAMPLE 3. CONCENTRATION = 0.3 MOLAR IN CARBON TETRACHLORIDE.

INVENTORS
CHARLES H. YOUNG
PAUL A. MUNDAY

BY J. Hart Evans

ATTORNEY

United States Patent Office 2,969,401
Patented Jan. 24, 1961

2,969,401
SEPARATION OF ALKYLATED PHENOLS BY SOLVENT EXTRACTION

Charles H. Young, Charleston, and Paul A. Munday, Dunbar, W. Va., assignors to Union Carbide Corporation, a corporation of New York Filed May 14, 1958, Ser. No. 735,143

6 Claims. (Cl. 260—624)

This invention relates to the separation of alkylated phenols having at least one tertiary alkyl group in a position ortho to the hydroxyl function, including position-isomers of such phenols.

The separation of phenol mixtures into individual compounds has long been a problem in industry and a considerable number of methods have been devised and heretofore proposed in an effort to solve that problem. Crystallization procedures have been found useful only on a limited scale with mixtures from which one component could readily be crystallized.

Fractional distillation is practiced to a considerable extent but unfortunately phenol itself is the only compound that can be recovered in substantially pure form by this method. It is capable of effecting partial separation of certain mixtures but is incapable of separating components, such as meta- and para-cresol, that have close boiling points. Fractional distillation also suffers from the disadvantage of requiring considerable heat and consequently promoting objectionable decomposition of the components.

Proposals have also been made to separate phenol mixtures by first alkylating them with an olefin, such as isobutylene or tripropylene, to make them more amenable to separation by distillation. Thus, for example, meta- and para-cresol, which both boil at 202° C. and therefore cannot be separated by distillation, can be butylated in a well known manner with an excess of isobutylene under acid catalysis to form 3-methyl-4,6-ditertiarybutylphenol, having a boiling point of 282° C., and 4-methyl-2,6-ditertiarybutylphenol, having a boiling point at 265° C., respectively. These butylated phenols can therefore be separated more easily by distillation and subsequently debutylated in known manner to obtain pure meta-cresol and pure para-cresol. This method, however, has certain disadvantages, primarily because of the high boiling temperatures of the butylated phenols. The considerable amount of heat that is required for their distillation, even at reduced pressures, makes the method expensive and the high temperatures involved in the distillation effect at least a partial debutylation of some of the phenols, with the result that yields of the pure separated phenols are low.

In accordance with this invention, phenols that have been alkylated by reaction with a tertiary olefin such as isobutylene or a higher homolog thereof can readily be separated without requiring distillation of high boiling materials by subjecting mixtures thereof to extraction with two organic solvents that are immiscible with one another and have different capacities for dissolving different alkylated phenols.

The method of the invention is preferably employed in the separation of phenols that have at least one tertiary alkyl group in a position ortho to the hydroxyl function. The alkylated phenols in a mixture subjected to separation may have the other ortho position unsubstituted or substituted by alkyl groups, including a tertiary butyl group or a higher homolog thereof. They may be position-isomers such as 3-methyl-4,6- and 4-methyl-2,6-ditertiarybutylphenols obtained by butylation of meta- and para-cresol, respectively. The alkylated phenols in a mixture to be separated can be successively higher homologs of one another, e.g., 2-methyl-, 2-ethyl-, and 2-propyl-4,6-ditertiarybutylphenols, and may be substituted with substituents larger than the butyl groups in positions ortho to the hydroxyl function. Thus, for example, isoamylene or diisobutylene can be used in place of isobutylene to react with a phenolic mixture prior to the extraction stages.

One of the immiscible organic solvents useful in the method of the invention is a polar solvent of the type represented by ethylene glycol, diethylene glycol, triethylene glycol, propylene glycol, ethylene carbonate, propylene carbonate, mono-, di- and triethanolamine, and aqueous methanol. Among these, the glycols have a number of advantages and are therefore preferred over the carbonates and ethanolamines. They are readily recoverable, relatively inexpensive, stable, less viscous, and non-toxic. They have sufficient capacity to dissolve one of the alkylated phenols in preference to another and are readily subject to back-extraction with a variety of secondary solvents such as isopropylether, ethylether, n-butylether and other ethers having boiling points between those of ethyl- and n-butylether. Diethylene glycol is preferred among the glycols because of its high capacity for alkylated phenol. Ethylene glycol, although it has greater selectivity than diethylene glycol, is not as highly preferred because of its lower capacity for dissolving butylated phenols. Ethylene glycol as well as the other glycols referred to are, however, entirely operable in the method of the invention.

The other of the competing solvents that are effective in the method of the invention are saturated non-aromatic liquid hydrocarbons, including mixtures thereof, particularly those distilling in the range of about 35 to 160° C. Hexane, cyclohexane and mixtures of saturated non-aromatic hydrocarbons distilling at about 80° to 90° C. are most convenient and therefore preferred. Pentane, heptane, nonane, decane and others are among the many hydrocarbons that are operable.

The ratios of total alkylated phenols to total solvents as well as the ratios of the competing solvents relative to one another may vary widely and depend, as will readily be appreciated by those skilled in the art, upon such factors as the identity and relative proportions of the various phenols in the mixture to be separated as well as by the selectivity and capacity of the solvents for the alkylated phenols. As a guide to those skilled in the art, it is generally desirable to adjust these ratios in such a manner that the hydrocarbon phase will contain about 5 to 25% by weight of the akylated phenol preferentially dissolved in it and that the polar solvent phase will contain about 3 to 15% by weight of the alkylated phenol preferentially dissolved in it. As a further and even more specific guide, it has been found that two parts of a 1:1 mixture of 4-methyl-2,6-ditertiarybutylphenol and 3-methyl-4,6-ditertiarybutylphenol are preferably subjected to separation with a mixture of five parts hexane and ten parts diethylene glycol, the parts being by weight. As a still further guide to a determination of optimum ratios by trial in accordance with known practices, it is generally desirable to use from one to three parts by weight of polar solvent in conjunction with one part by weight hydrocarbon solvent. While the ratio of phenolic mixture to total solvents can be varied widely without losing the advantages of the invention, it is generally more economical to operate with the minimum amount of solvents necessary to effect the desired separation.

The process can be carried out as a single or multiple-stage batch process or as a single or multiple-stage continuous process. The mixture of alkylated phenols may be introduced as such into a mixture of the solvents. A mixture of the phenols in one of the solvents can also be introduced into the other competing solvent. In a continuous process it is generally desirable to introduce the phenolic mixture into a separation column, preferably at about the center, while the competing solvents are introduced at opposite ends for countercurrent flow. It is also highly desirable, when extraction of the alkylated phenol in the polar solvent phase is carried out with a secondary solvent, to remove any residual secondary solvent in the polar solvent before recycling it for admixture with the hydrocarbon solvent in order to avoid transfer of the secondary solvent to the hydrocarbon solvent.

Pressure and temperature are not critical except in so far as these conditions may require adjustment in order that the components of the system are all in the liquid state. The preferred pressure is atmospheric pressure and the preferred temperature is room or ambient temperature. If somewhat poorer separations due to the consequent lower selectivity of the solvent at elevated temperatures are permissible, slightly elevated temperatures may be employed to obtain such effects as reduction in viscosity of one or both solvents.

While the invention is not to be limited by any theory advanced herein, it is believed that the selectivity of the two competing types of solvents used in the process is governed by the relative ability or inability of the alkylated phenols to form hydrogen bonds with the polar solvent and that the inability to form such hydrogen bonds increases with the steric hindrance offered by the alkyl group or groups in the position or positions ortho to the hydroxyl function. This is exemplified by the fact that 4-methyl-2,6-ditertiarybutylphenol, having tertiary butyl substituents in both ortho positions, is preferentially dissolved in hexane by a factor of 13.5:1 when the two solvents used are hexane and diethylene glycol, whereas the isomer thereof, 3-methyl-4,6-ditertiarybutylphenol in which one of the ortho positions is substituted by a tertiary butyl group and the other has no alkyl substituents, is preferentially dissolved in the glycol by a factor of 4.4:1. The combined separation coefficient of these two isomers is, therefore, approximately 60.

With phenols having a tertiary alkyl group in one position ortho to the hydroxyl function, those having a second alkyl group substituted in the other ortho position become less soluble in the polar solvent as the number of carbon atoms in said second alkyl group increases, 2-ethyl-4,6-ditertiarybutylphenol being less soluble than the lower homolog 2-methyl-4,6-ditertiarybutylphenol and more soluble than the next higher homolog 2-propyl-4,6-ditertiarybutylphenol. An examination of the distribution coefficients of these and other butylated phenols in a mixture of hexane and diethylene glycol shows that apparently the number and size of the alkyl substituents on the phenols have an effect that is subordinate to the steric effects. This will become apparent from the data in the following table showing the distribution coefficients of representative butylated phenols in mixtures of five parts by weight hexane and five parts by weight diethylene glycol to one part phenol.

TABLE I

| Phenol | Distribution Coefficient, Hexane/Glycol |
| --- | --- |
| 2,4,6-Tritertiarybutylphenol | 48.5 |
| 4-Methyl-2,6-ditertiarybutylphenol | 13.5 |
| 2,6-Ditertiarybutylphenol | 9.2 |
| 2-Isopropyl-4,6-ditertiarybutylphenol | 7.4 |
| 2-n-Propyl-4,6-ditertiarybutylphenol | 5.9 |
| 2-Ethyl-4,6-ditertiarybutylphenol | 4.9 |
| 2-Methyl-4,6-ditertiarybutylphenol | 1.8 |
| 2,4-Dimethyl-6-tertiarybutylphenol | 0.75 |

TABLE I—Continued

| Phenol | Structure | Distribution Coefficient, Hexane/Glycol |
|---|---|---|
| 3-Ethyl-4,6-ditertiary-butylphenol. | (structure) | 0.40 |
| 2-(1,1,3,3-Tetramethyl-butyl)-4-methylphenol. | (structure) | 0.24 |
| 3-Methyl-4,6-ditertiary-butylphenol. | (structure) | 0.23 |
| 2,4-Ditertiarybutylphenol. | (structure) | 0.17 |

The utility of representative polar and hydrocarbon solvents in the method of the invention is demonstrated by the data in Tables II and III showing the results obtained by dissolving a phenol mixture consisting of equal parts by weight 3-methyl-4,6- and 4-methyl-2,6-ditertiarybutylphenols in various hydrocarbon solvents and extracting the solution once, in a separatory funnel, with a polar solvent. The raffinate or hydrocarbon phases were separated and water-washed, the hydrocarbon was evaporated and the residues were analyzed by infrared spectrometry for the two phenols. The extract phases were each extracted three times with equal volumes of isopropylether and the three ether extracts were in each instance combined, water-washed and the ether was evaporated, the residue therefrom being analyzed likewise for the two phenols.

TABLE II

| | Ethylene Glycol | Ethylene Glycol | Diethylene Glycol | Diethylene Glycol | Propylene Glycol | Triethylene Glycol |
|---|---|---|---|---|---|---|
| Polar solvent, grams | 50 | 100 | 50 | 32 | 50 | 100 |
| Hydrocarbon solvent: | | | | | | |
| Hexane, grams | 12 | | 12 | | 12 | |
| Cyclohexane, grams | | 16 | | | | 20 |
| Heptane, grams | | | | 16 | | |
| Initial Phenols: | | | | | | |
| 3-Methyl-4,6-ditertiarybutylphenol, grams | 1 | 2 | 1 | 2 | 1 | 2 |
| 4-Methyl-2,6-ditertiarybutylphenol, grams | 1 | 2 | 1 | 2 | 1 | 2 |
| Raffinate Phenols:[1] | | | | | | |
| Weight recovered, grams | 1.3 | 2.5 | 0.4 | 0.9 | 0.8 | 1.6 |
| 3 - Methyl - 4,6 - ditertiarybutylphenol, weight percent | 33 | 38 | 6 | 10 | 8 | 3 |
| 4 - Methyl - 2,6 - ditertiarybutylphenol, weight percent | 67 | 62 | 94 | 90 | 92 | 97 |
| Extract Phenols:[2] | | | | | | |
| Weight recovered, grams | 0.7 | 0.7 | 1.1 | 1.0 | 0.9 | 2.2 |
| 3 - Methyl - 4, 6 - ditertiarybutylphenol, weight percent | 100 | 100 | 87 | 85 | 92 | 61 |
| 4 - Methyl - 2,6 - ditertiarybutylphenol, weight percent | nil | nil | 13 | 15 | 8 | 39 |

[1] In the hydrocarbon phase on a solvent-free basis.
[2] In the glycol phase on a solvent-free basis.

TABLE III

| | Ethylene Carbonate | Propylene Carbonate | Monoethanolamine | Diethanolamine | Triethanolamine | 80% Aqueous Methanol |
|---|---|---|---|---|---|---|
| Polar solvent, grams | 50 | 100 | 100 | 100 | 100 | 100 |
| Hydrocarbon solvent: | | | | | | |
| Hexane, grams | 12 | 20 | 20 | 16 | 16 | 16 |
| Initial Phenols: | | | | | | |
| 3-Me-4,6-di-t-butylphenol, grams | 1 | 2 | 2 | 2 | 2 | 2 |
| 4-Me-2,6-di-t-butylphenol, grams | 1 | 2 | 2 | 2 | 2 | 2 |
| Raffinate Phenols:[1] | | | | | | |
| Weight recovered, grams | 1.0 | 0.8 | 1.3 | 0.7 | 1.4 | 3.0 |
| 3-Me-4,6-di-t-butylphenol, weight percent | 26 | 5 | nil | 1 | 4 | 31 |
| 4-Me-2,6-di-t-butylphenol, weight percent | 74 | 95 | 100 | 99 | 96 | 69 |
| Extract Phenols:[2] | | | | | | |
| Weight recovered, grams | 0.5 | 2.0 | 2.0 | 0.4 | 0.8 | 1.0 |
| 3-Me-4,6-di-t-butylphenol, weight percent | 94 | 64 | 79 | 85 | 82 | 94 |
| 4-Me-2,6-di-t-butylphenol, weight percent | 6 | 36 | 21 | 15 | 18 | 6 |

[1] In the hydrocarbon phase on a solvent-free basis.
[2] In the polar solvent phase on a solvent-free basis.

In one preferred embodiment of the invention which is illustrative of the broader aspects of the invention, meta-cresol is separated from para-cresol by reacting the mixture thereof with excess isobutylene in the presence of 5% by weight sulfuric acid at a temperature of 70° C. to effect conversion of the cresols to 3-methyl-4,6- and 4-methyl-2,6-ditertiarybutylphenols, respectively; feeding the mixture of butylated cresols to an extraction column near the center while diethylene glycol and hexane are fed to the column near the top and bottom, respectively; removing the hexane and diethylene glycol phases separately from the top and bottom, respectively; washing the hexane phase with water to remove dissolved diethylene glycol and then distilling it in order to recycle the hexane and collect the 4-methyl-2,6-ditertiary-butylphenol therein; back-extracting the diethylene glycol phase with isopropylether as a secondary solvent to recover the dissolved 3-methyl-4,6-ditertiarybutylphenol; stripping the diethylene glycol of dissolved ether for recycling of the glycol; washing the ether extract with water to remove dissolved diethylene glycol; distilling the ether for reuse in the process and collecting the residual 3-methyl-4,6-ditertiarybutylphenol; and finally debutylating the two residual phenols to substantially pure meta- and para-cresol.

One of the primary advantages of the method of this invention is that the separation can be carried out at substantially ambient temperatures, the only precaution to be taken, in so far as temperature is concerned, being to make certain that all components are in the liquid state, elevated temperatures being required only for the recovery of the separated components from the selected solvents. Another important advantage is that separation is feasible not only as among phenols alkylated to varying degrees but also between isomers, i.e., in which the degree of alkylation is identical.

These and other advantages as well as the utility of the invention will become further apparent from the following examples and the detailed description made with reference to the accompanying drawing.

Figure 1:
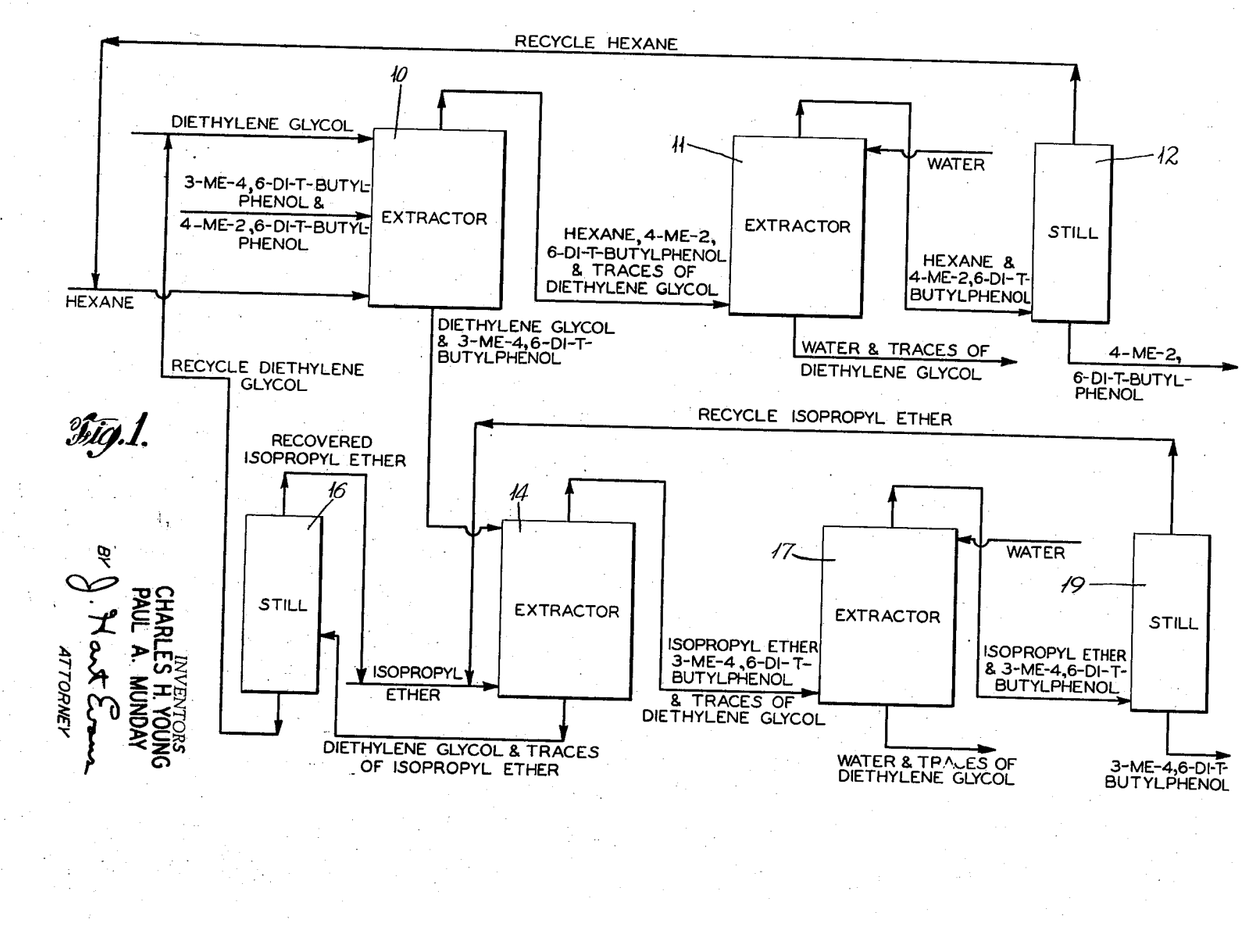
Figure 1 is a flow sheet of a typical separation process in accordance with the invention.

Figure 1 is a flow diagram showing, by way of example, a typical continuous process utilizing two specific competing solvents for extracting and separating two specific phenols that are position-isomers of one another. The phenols are 3-methyl-4,6- and 4-methyl-2,6-ditertiarybutylphenols, the glycol solvent is diethylene glycol and the hydrocarbon solvent is hexane. It is to be understood of course that the method is applicable to the separation of other phenols having one or more tertiary alkyl groups, at least one of which is in an ortho position, and that it may also be adapted for use with competing solvents other than diethylene glycol and hexane.

A mixture of phenols is introduced to the center of an extraction column 10 and mixed with diethylene glycol and hexane introduced at the top and bottom, respectively, of the column. The lighter hexane phase, predominantly containing 4-methyl-2,6-ditertiarybutylphenol and traces of diethylene glycol, is withdrawn from the top of column 10 and washed with water in an extractor 11. The washed hexane phase, still containing 4-methyl-2,6-ditertiarybutylphenol, is subjected to distillation in a still 12, the phenol being recovered as a substantially pure product and the distilled hexane being recycled to the column 10.

The diethylene glycol phase containing predominantly 3-methyl-4,6-ditertiarybutylphenol is removed from the bottom of column 10 and subjected to extraction with isopropylether in an extractor 14. The diethylene glycol that is removed with traces of isopropylether is subjected to distillation in a still 16, whereupon the distilled isopropylether that is recovered is recycled for reintroduction into the extractor 14 and the purified diethylene glycol is recycled for reintroduction into the extractor 10. The isopropylether phase from extractor 14 is washed with water in an extractor 17 for removing traces of diethylene glycol and the purified isopropylether phase containing 3-methyl-4,6-ditertiarybutylphenol is subjected to distillation in a still 19 to remove the isopropylether, which is recycled to the extractor 14 along with the ether recovered from the still 16.

Example 1

One gram of 3-methyl-4,6-ditertiarybutylphenol and one gram of 4-methyl-2,6-ditertiarybutylphenol were dissolved in 10 grams of hexane. This solution was extracted with 100 ml. ethylene glycol. The glycol phase was extracted with isopropylether, the resulting ether extract was washed with water to remove dissolved ethylene glycol and the ether was then evaporated to leave 0.7 gram of a residue having an infrared absorption spectrum showing it to be substantially pure 3-methyl-4,6-ditertiarybutylphenol. The hexane phase was likewise evaporated to leave 0.7 gram of a residue having an infrared absorption spectrum showing it to be substantially pure 4-methyl-2,6-ditertiarybutylphenol.

Example 2

A portion of a distillation fraction of coal hydrogenation phenols containing cresols, ethylphenols, xylenols and some unidentified phenols was subjected to exhaustive butylation under acid catalysis with sulfuric acid at 70° C. The reaction product was extracted with aqueous sodium hydroxide solution to remove caustic soluble phenols. The remaining phenols were subjected to selective solvent extraction between diethylene glycol and hexane by feeding the phenols to the center of an eleven-stage, one inch diameter extraction column and simultaneously introducing diethylene glycol to the top of the column and hexane to the bottom. The hexane dissolved part of the phenols and the glycol dissolved the remainder. The phenols in the hexane phase were recovered by washing the hexane phase with water to remove residual glycol and distilling off the hexane. The phenols in the diethylene glycol phase were recovered by back-extracting the phase with isopropylether, washing the ether extract with water to remove residual glycol, and distilling off the ether.

Figure 3:
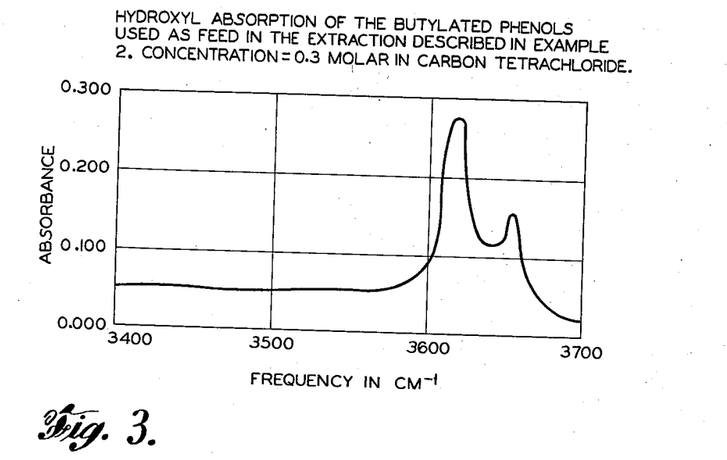
Figures 3, 4 and 5 are infrared absorption spectra showing the separations obtained in accordance with one example of the method of the invention.
Figure 4:
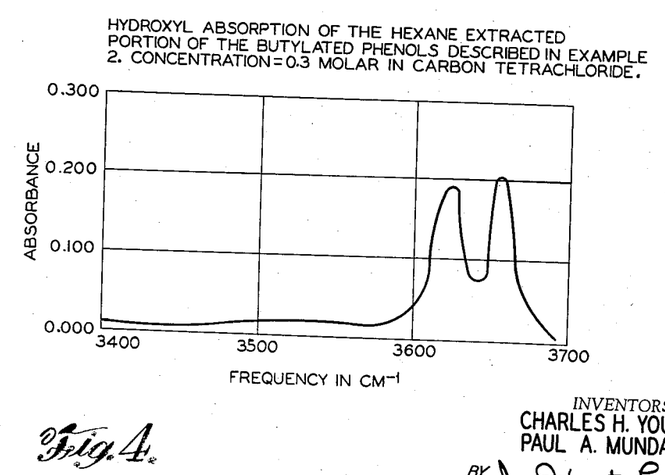
Figure 5:
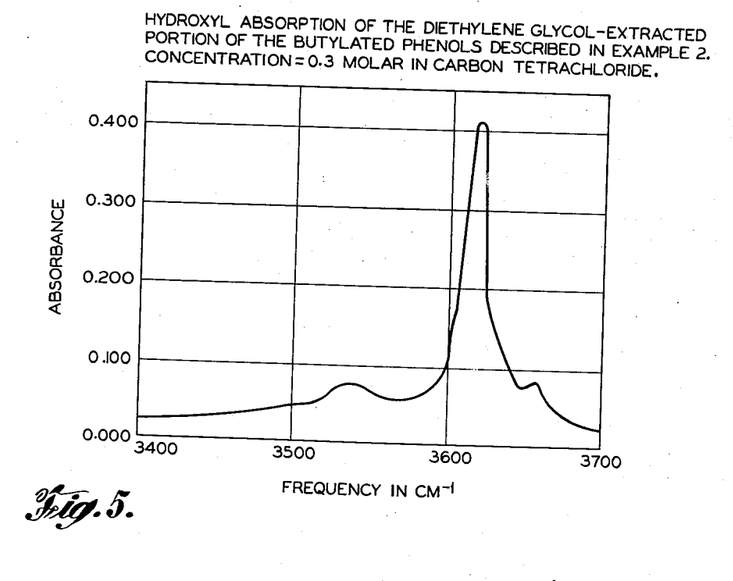

The infrared absorption spectra of 0.3 molar solutions in carbon tetrachloride of the phenolic feed to the extraction column, the phenols recovered from the hexane phase, and the phenols recovered from the diethylene glycol phase were taken in the 3500–3700 cm.$^{-1}$ region. These spectra are shown in Figures 3, 4 and 5, respectively.

It will be noted that the spectrum of the diethylene glycol-extracted portion of the phenols exhibits a broad band centered between 3500 and 3575 cm.$^{-1}$ while that of the hexane-extracted portion of the phenols does not. Also, the spectrum of the diethylene glycol-extracted phenols exhibits a substantially reduced intensity of the band centered in the 3645–3665 cm.$^{-1}$ region, as compared to that of the feed, while the spectrum of the hexane-extracted phenols exhibits a substantially increased intensity of that band.

Example 3

A sample of butylated phenols was obtained in the following manner:

A narrow-boiling cut of coal hydrogenation phenols, boiling range 226 to 227° C., was reacted with an excess of isobutylene under sulfuric acid catalysts. The catalyst was removed from the reaction product by washing with sodium carbonate solution. The excess isobutylene, the isobutylene polymers formed, and the unreacted phenols were distilled from the reaction product.

A 2354 gram sample of the resulting butylated phenols was distributed between hexane and diethylene glycol by continuous extraction in an eleven-stage York-Scheibel extraction column four feet long and having an inside diameter of one inch. The phenols were introduced at the middle of the column, the hexane at the bottom, and the diethylene glycol at the top. The diethylene glycol extract was removed from the bottom of the column and the hexane extract from the top. The hexane extract was washed with water to remove residual diethylene glycol, and the hexane distilled. The phenols recovered from the hexane amounted to 399 grams, 17% of the feed. The diethylene glycol extract was exhaustively extracted with isopropylether to remove the phenols. The isopropylether extract was water-washed to remove residual diethylene glycol, and the ether distilled. The phenols recovered amounted to 1949 grams, 83% of the feed.

Figure 6:
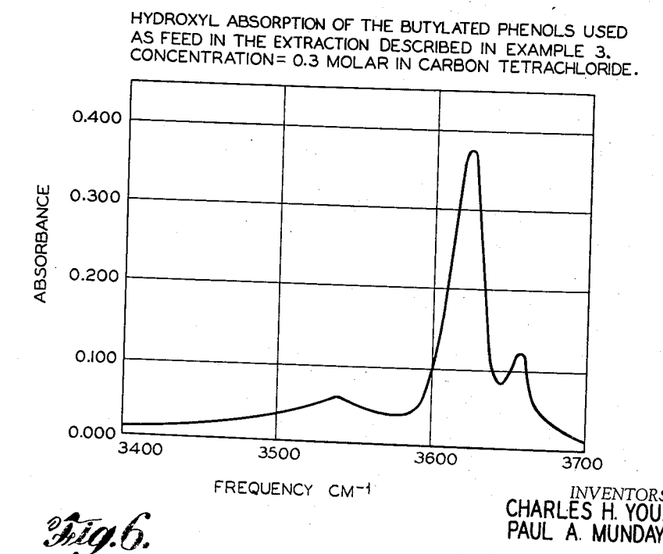
Figures 6, 7 and 8 are infrared absorption spectra showing the separations obtained in accordance with another example of the method of the invention.
Figure 7:
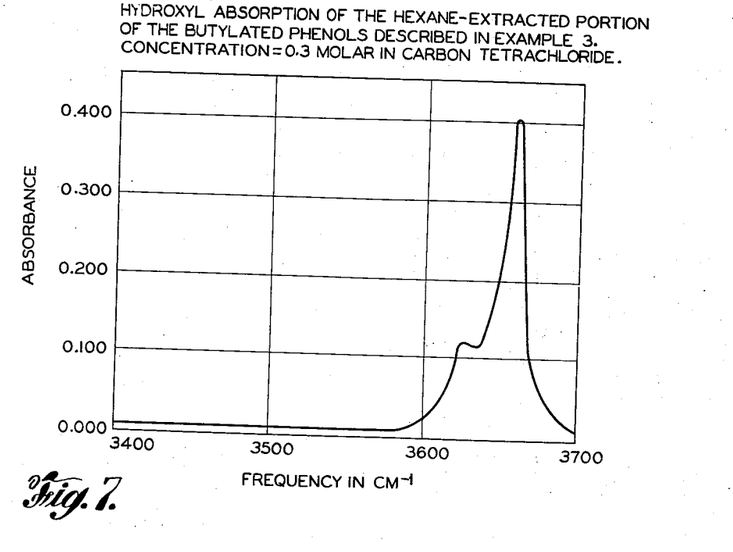
Figure 8:
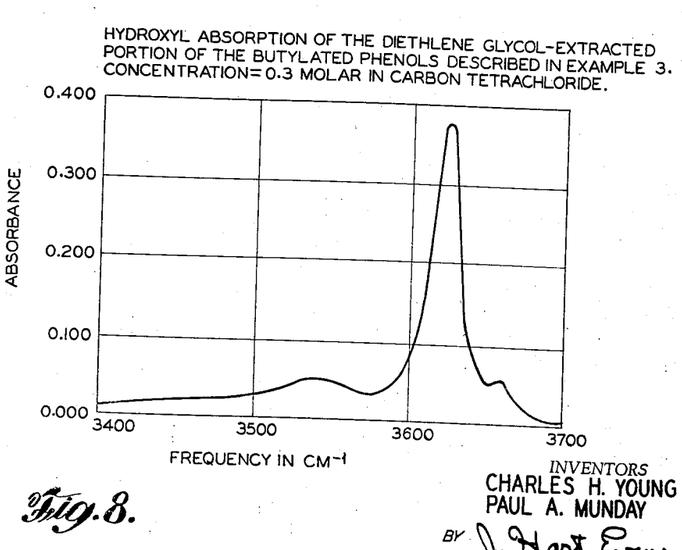

The infrared absorption spectra of 0.3 molar solutions in carbon tetrachloride of the phenolic feed to the extraction column, the phenols recovered from the hexane phase, and the phenols recovered from the diethylene glycol phase, were taken in the 3500–3700 cm.$^{-1}$ region. The spectra are shown in Figures 6, 7 and 8, respectively.

It will be noted that the spectra of the feed and diethylene glycol-extracted phenols exhibit a broadband centered between 3500 and 3575 cm.$^{-1}$, while that of the hexane-extracted phenols does not. The spectrum of the diethylene glycol-extracted phenols exhibits a substantially reduced intensity of the band centered in the 3645–3665 cm.$^{-1}$ region, as compared to that of the feed, while the spectrum of the hexane-extracted phenols exhibits a greatly increased intensity of that band.

*Example 4*

Figure 2:
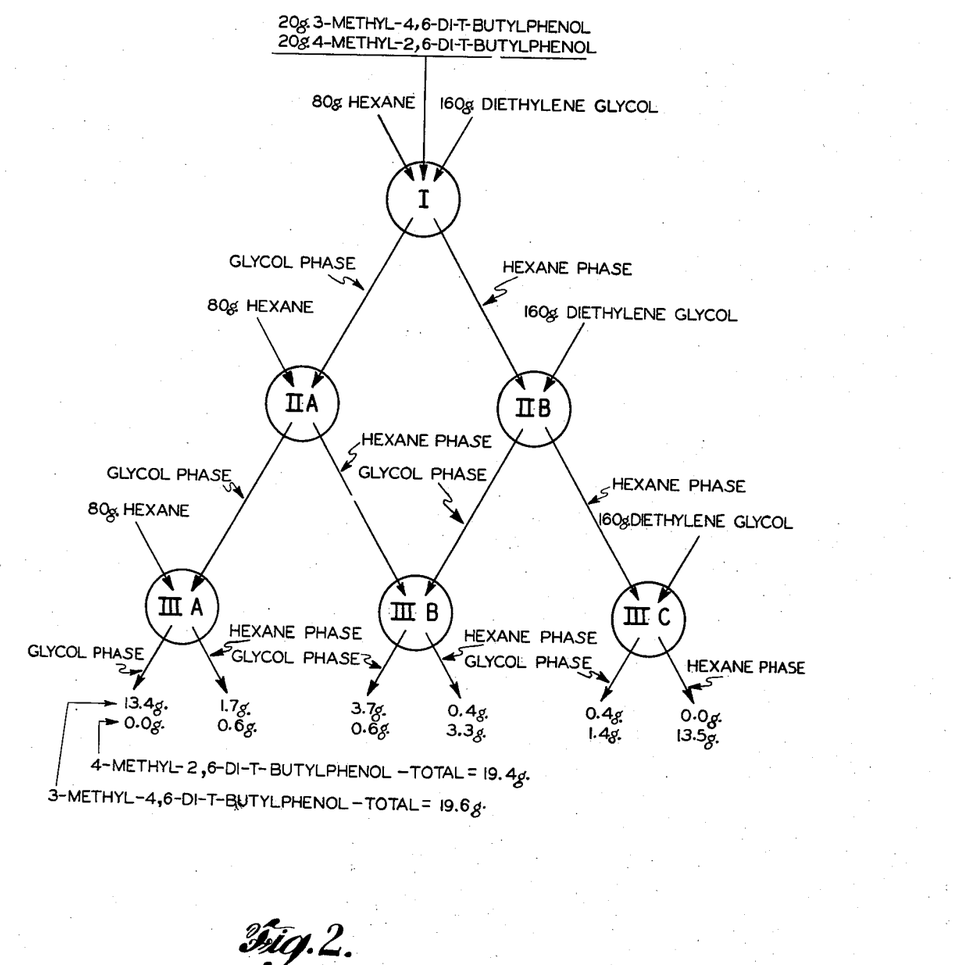
Figure 2 is a diagrammatic representation of a typical multi-stage process.

A 1:1 mixture of 3-methyl-4,6-ditertiarybutylphenol and 4-methyl-2,6-ditertiarybutylphenol was subjected to selective solvent extraction with hexane and diethylene glycol in a three-stage batchwise countercurrent distribution system such as that illustrated schematically in Figure 2. As indicated in the drawing, the first stage involved extraction of 20 grams of each of the two phenols with 80 grams hexane and 160 grams diethylene glycol. Part A of the second stage involved extraction of the glycol phase from Stage I with 80 grams hexane and Part B involved extraction of the hexane phase from Stage I with 160 grams diethylene glycol. Part A of Stage III involved re-extraction of the glycol phase from Stage II(A) with 80 grams hexane, Part B of Stage III involved mixing the hexane phase of Stage II(A) with the glycol phase of Stage II(B) and Part C of Stage III involved extraction of the hexane phase of Stage II(B) with 160 grams diethylene glycol. The contents of the six glycol and hexane phases from Stage III are indicated on the drawing, it being noted particularly that the glycol phase of Stage III(A) contained 13.4 grams 3-methyl-4,6-ditertiarybutylphenol and no 4-methyl-2,6-ditertiarybutylphenol, whereas the hexane phase of Stage III(C) contained 13.5 grams 4-methyl-2,6-ditertiarybutylphenol and no 3-methyl-4,6-ditertiarybutylphenol, as determined by analysis by infrared spectroscopy. A total of 98% of the 3-methyl-4,6-ditertiarybutylphenol was recovered, 67% of it as the purified chemical free of the other phenol, and a total of 97% of the 4-methyl-2,6-ditertiarybutylphenol was recovered, 67.5% of it as a purified chemical free of 3-methyl-4,6-ditertiarybutylphenol.

*Example 5*

A mixture containing five grams each of 2-(1,1,3,3-tetramethylbutyl)-4-methylphenol:

(A)

and 4-methyl-2,6-di-t-butylphenol:

(B)

was contacted simultaneously with 100 grams of diethylene glycol and 50 grams of a petroleum ether fraction (a saturated non-aromatic hydrocarbon fraction) having a boiling range of 80° to 90° C. The components were shaken thoroughly in a separatory funnel and allowed to stand while two phases formed. The phases were separated and the petroleum ether phase washed with two 50 ml. portions of water. When the petroleum ether was allowed to evaporate, five grams of solid remained which analyzed, by infrared spectrometry, 12% (A) and 88% (B). The diethylene glycol phase was extracted with four 50 ml. portions of isopropylether, and the ether extracts combined and washed with three 50 ml. portions of water. When the isopropylether was allowed to evaporate, five grams of solid remained containing 89% (A) and 11% (B).

This example demonstrates the operability of the method of the invention to the separation of phenols alkylated with diisobutylene as well as with other tertiary olefins that are higher homologs of isobutylene, such as isoamylene and the like.

It is to be expected that numerous modifications will readily become apparent to those skilled in the art upon reading this description. All such modifications are intended to be included within the scope of the invention as defined in the appended claims.

We claim:

1. In a process for separating a mixture of phenols wherein one phenol has two tertiary alkyl groups in ortho positions to the hydroxyl group and another phenol in the mixture has two tertiary alkyl groups, one in the para position to the hydroxyl function and one in one of the ortho positions, the steps which comprise subjecting a mixture of said phenols to extraction with substantially immiscible organic solvents, one of said solvents A being selected from the group consisting of ethylene glycol, diethylene glycol, triethylene glycol, propylene glycol, ethylene carbonate, propylene carbonate, mono-, di- and triethanolamine, and aqueous methanol, and the other solvent B comprising essentially a saturated non-aromatic liquid hydrocarbon distilling in the range of about 35° to 160° C., and separately withdrawing a first product stream of phenol having tertiary alkyl groups in both ortho positions preferentially dissolved in the solvent B and a second product stream of phenol having a tertiary alkyl group in only one ortho position preferentially dissolved in solvent A.

2. In a process for separating a mixture of 3-methyl-4,6-ditertiarybutylphenol and 4 - methyl-2,6-ditertiarybutylphenol, the steps which comprise subjecting a mixture of said phenols to extraction with substantially immiscible organic solvents, one of said solvents A being selected from the group consisting of ethylene glycol, diethylene glycol, triethylene glycol, propylene glycol, ethylene carbonate, propylene carbonate, mono-, di- and tri-ethanolamine, and aqueous methanol, and the other solvent B essentially comprising a saturated non-aromatic liquid hydrocarbon distilling in the range of about 35° to 160° C., and separately withdrawing product streams of 3-methyl-4,6-ditertiarybutylphenol and 4-methyl-2,6-ditertiarybutylphenol preferentially dissolved in solvents A and B, respectively.

3. In a process for separating a mixture of 2-(1,1,3,3-tetramethylbutyl)-4-methylphenol and 4-methyl-2,6-di-t-butylphenol, the steps which comprise subjecting a mixture of said phenols to extraction with substantially immiscible organic solvents, one of said solvents A being selected from the group consisting of ethylene glycol, diethylene glycol, triethylene glycol, propylene glycol, ethylene carbonate, propylene carbonate, mono-, di- and triethanolamine, and aqueous methanol, and the other solvent essentially comprising B a saturated non-aromatic liquid hydrocarbon distilling in the range of about 35° to 160° C., and separately withdrawing product streams of 2-(1,1,3,3-tetramethylbutyl)-4-methylphenol and 4-methyl-2,6-di-t-butylphenol preferentially dissolved in solvents A and B, respectively.

4. In a process for separating 3-methyl-4,6-ditertiarybutylphenol and 4-methyl-2,6-ditertiarybutylphenol from a mixture of said phenols, the steps which comprise subjecting the mixture to extraction with hexane and diethylene glycol for preferentially dissolving the 3-methyl-4,6-ditertiarybutylphenol in the resulting diethylene glycol phase and for preferentially dissolving the 4-methyl-2,6-ditertiarybutylphenol in the resulting hexane phase, and separately withdrawing the diethylene glycol phase and the hexane phase as distinct product streams.

5. In a process for separating 3-methyl-4,6-ditertiarybutylphenol and 4-methyl-2,6-ditertiarybutylphenol from a mixture of said phenols, the steps which comprise subjecting the mixture to extraction with hexane and ethylene glycol for preferentially dissolving the 3-methyl-4,6-ditertiarybutylphenol in the resulting ethylene glycol phase and for preferentially dissolving the 4-methyl-2,6-ditertiarybutylphenol in the resulting hexane phase, and separately withdrawing the ethylene glycol phase and the hexane phase as distinct product streams.

6. In a process for separating 2-(1,1,3,3-tetramethylbutyl)-4-methylphenol and 4-methyl-2,6-ditertiarybutylphenol from a mixture of said phenols, the steps which comprise subjecting the mixture to extraction with diethylene glycol and a petroleum ether fraction having a boiling range of about 80 to 90° C. for preferentially dissolving the 3-methyl-4,6-ditertiarybutylphenol in the resulting diethylene glycol phase and for preferentially dissolving the 4-methyl-2,6-ditertiarybutylphenol in the resulting petroleum ether phase, and separately withdrawing the diethylene glycol phase and the petroleum ether phase as distinct product streams.

References Cited in the file of this patent
UNITED STATES PATENTS

| | | |
|---|---|---|
| 2,684,388 | Sullivan et al. | July 20, 1954 |
| 2,790,834 | Morton et al. | Apr. 30, 1957 |